United States Patent
Hauser et al.

[11] Patent Number: 5,445,443
[45] Date of Patent: Aug. 29, 1995

[54] MOTORCYCLE ABS USING HORIZONTAL AND VERTICAL ACCELERATION SENSORS

[75] Inventors: Berthold Hauser, Frauenneuharting; Heinz F. Ohm, Weiterstadt; Georg Roll, Heusenstamm, all of Germany

[73] Assignee: Bayerische Motoren Werke Aktiengesellschaft, Munich, Germany

[21] Appl. No.: 172,225

[22] Filed: Dec. 23, 1993

[30] Foreign Application Priority Data

Dec. 24, 1992 [DE] Germany ............... 42 44 112.9

[51] Int. Cl.$^6$ ............................................. B60T 8/32
[52] U.S. Cl. ........................................ 303/137; 303/9.64
[58] Field of Search ............... 303/100, 9.64, 115.6, 303/108, 111, 103, 105; 364/426.01, 426.02, 426.04

[56] References Cited

U.S. PATENT DOCUMENTS

| | | | |
|---|---|---|---|
| 4,989,922 | 2/1991 | Pickenhahn et al. | 303/100 |
| 5,244,259 | 9/1993 | Pickenhahn et al. | 303/111 |
| 5,324,102 | 6/1994 | Roll et al. | 303/9.64 X |
| 5,332,301 | 7/1994 | Roll et al. | 303/103 |
| 5,344,220 | 9/1994 | Roll et al. | 303/9.64 |

FOREIGN PATENT DOCUMENTS

| | | | |
|---|---|---|---|
| 0550849 | 7/1993 | European Pat. Off. | 303/9.64 |
| 3839520A1 | 5/1990 | Germany . | |
| 4225219 | 2/1993 | Germany | 303/100 |
| 4204350A1 | 8/1993 | Germany . | |
| 4215350A1 | 11/1993 | Germany . | |

*Primary Examiner*—Josie A. Ballato
*Attorney, Agent, or Firm*—Evenson, McKeown, Edwards & Lenahan

[57] ABSTRACT

An antilock brake system for motorcycles, which ensures that after travel on a curve has been definitely recognized, a modified antilock brake system is activated which adjusts itself dynamically to the degree of tilt reached. The antilock brake system monitors travel on the curve and the degree of tilt with two acceleration sensors and supplements the monitoring circuit by an auxiliary circuit which causes the ABS control, through control signals, to maintain the braking pressure on the front wheel even before the anticipated lockup pressure is reached.

13 Claims, 13 Drawing Sheets

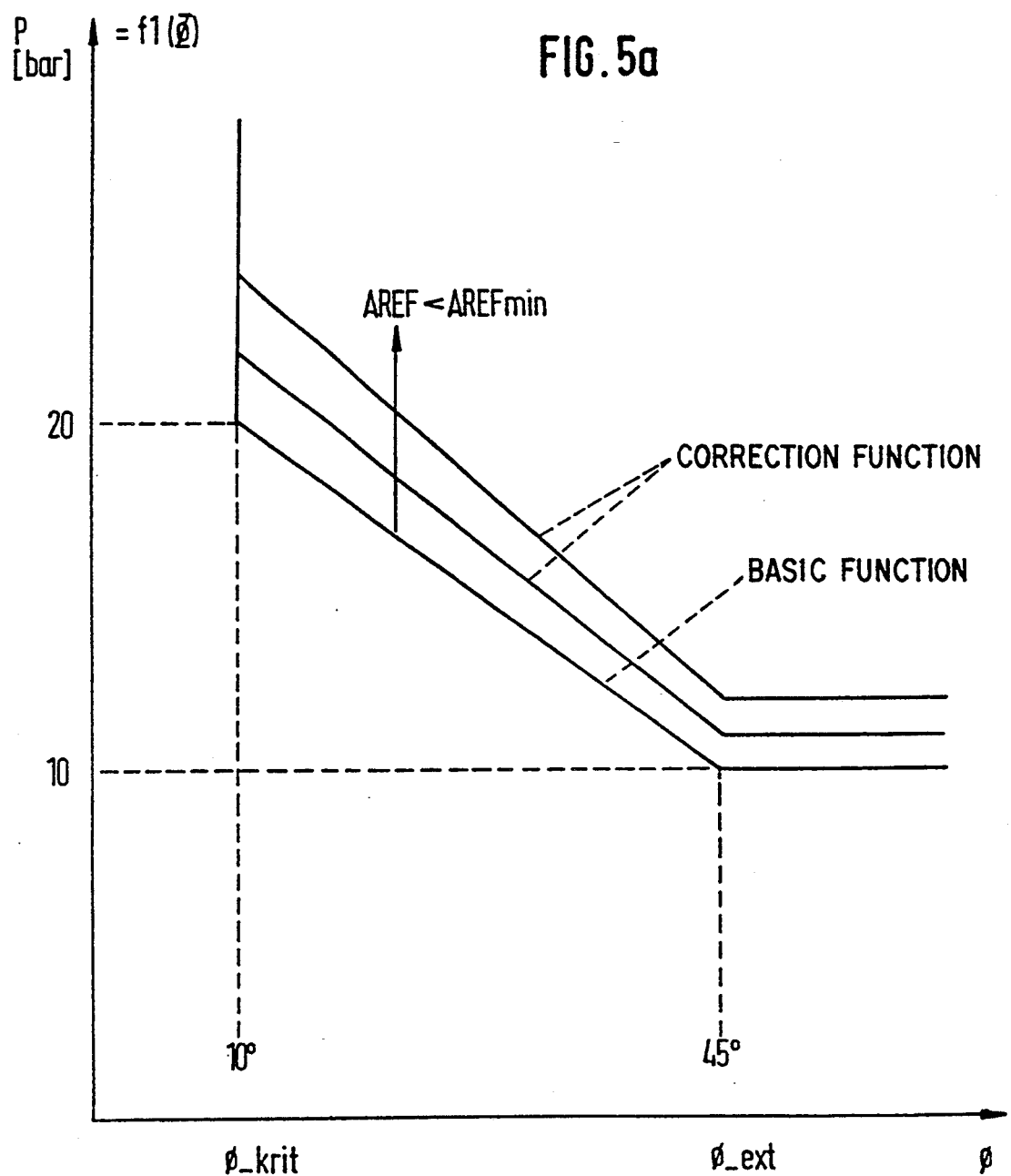

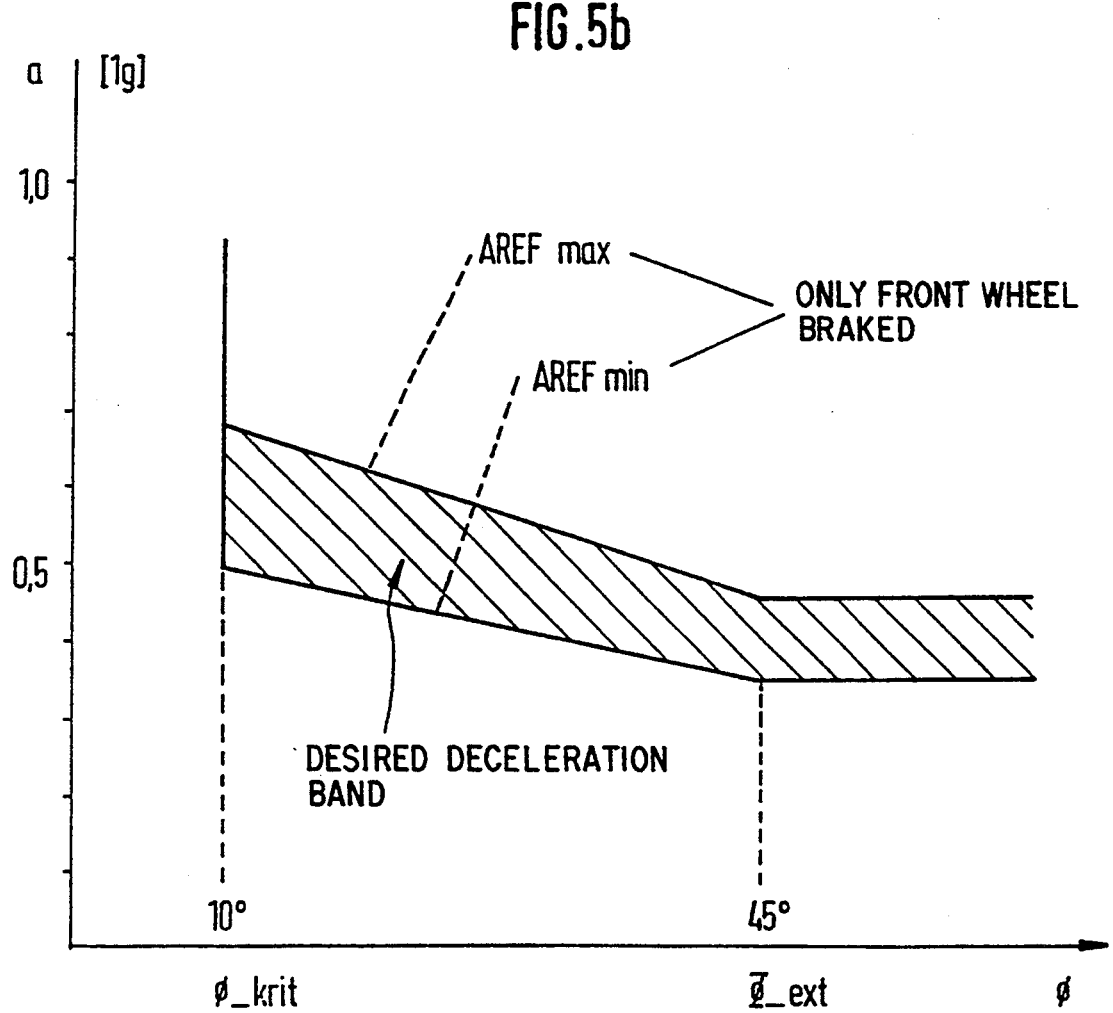

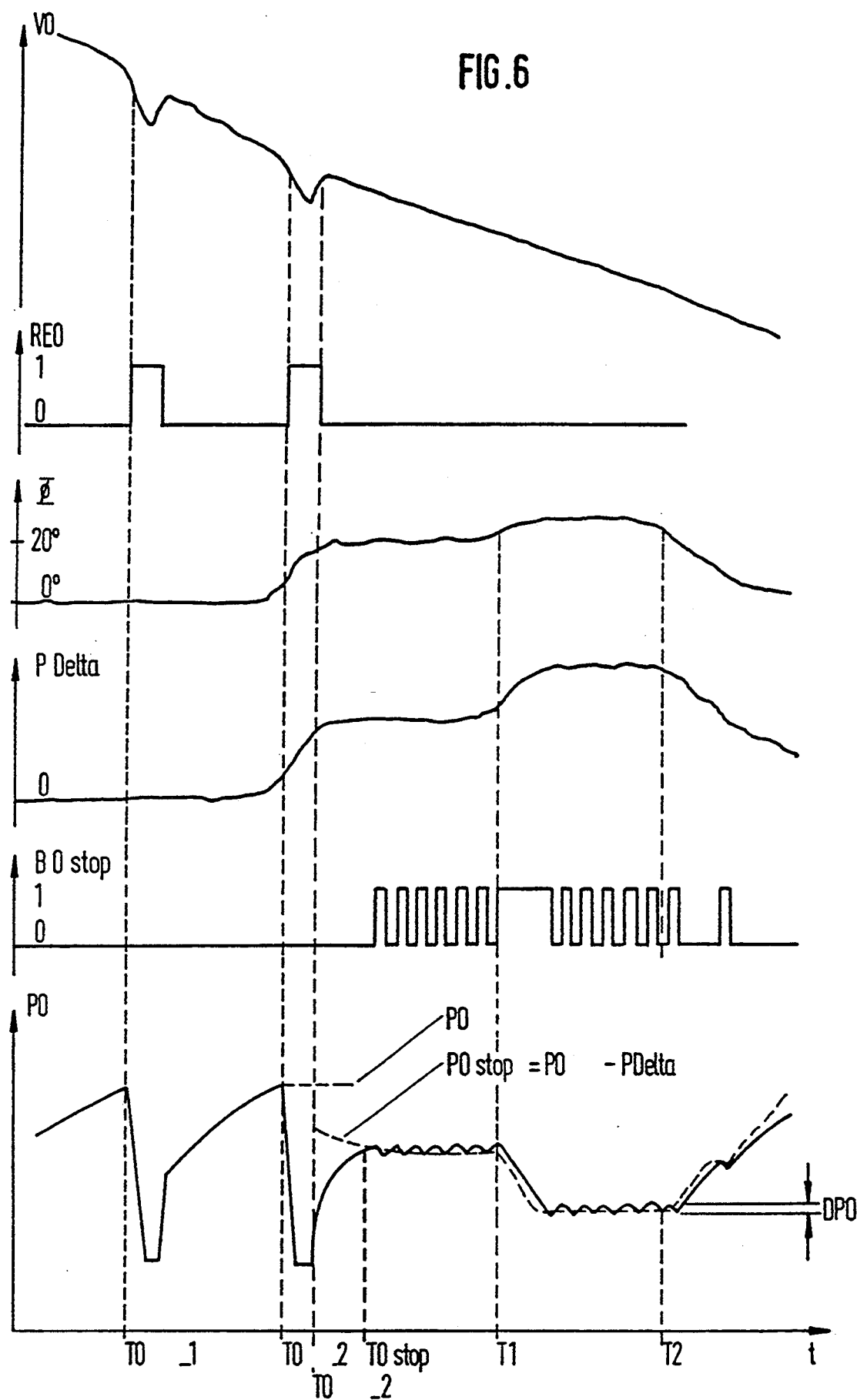

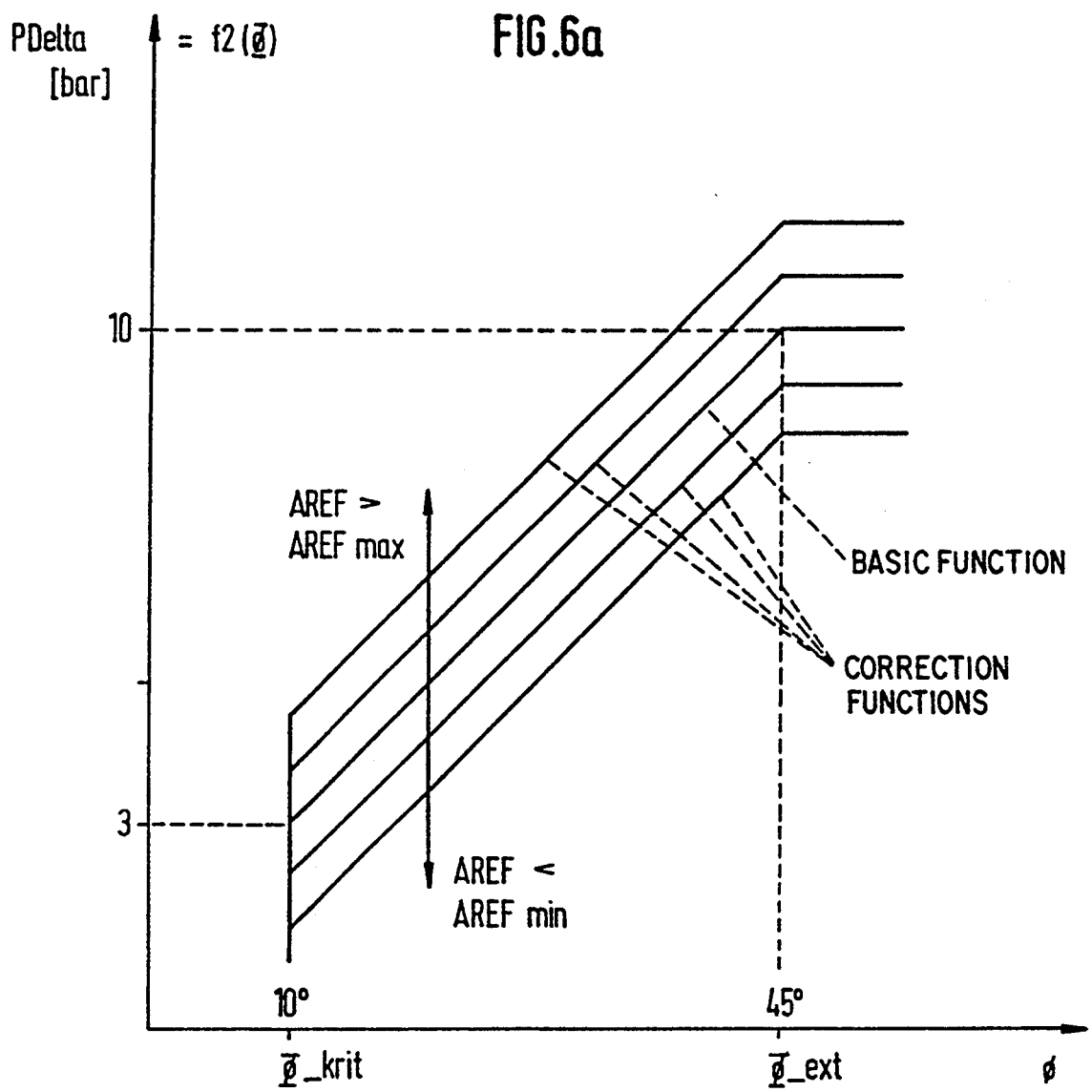

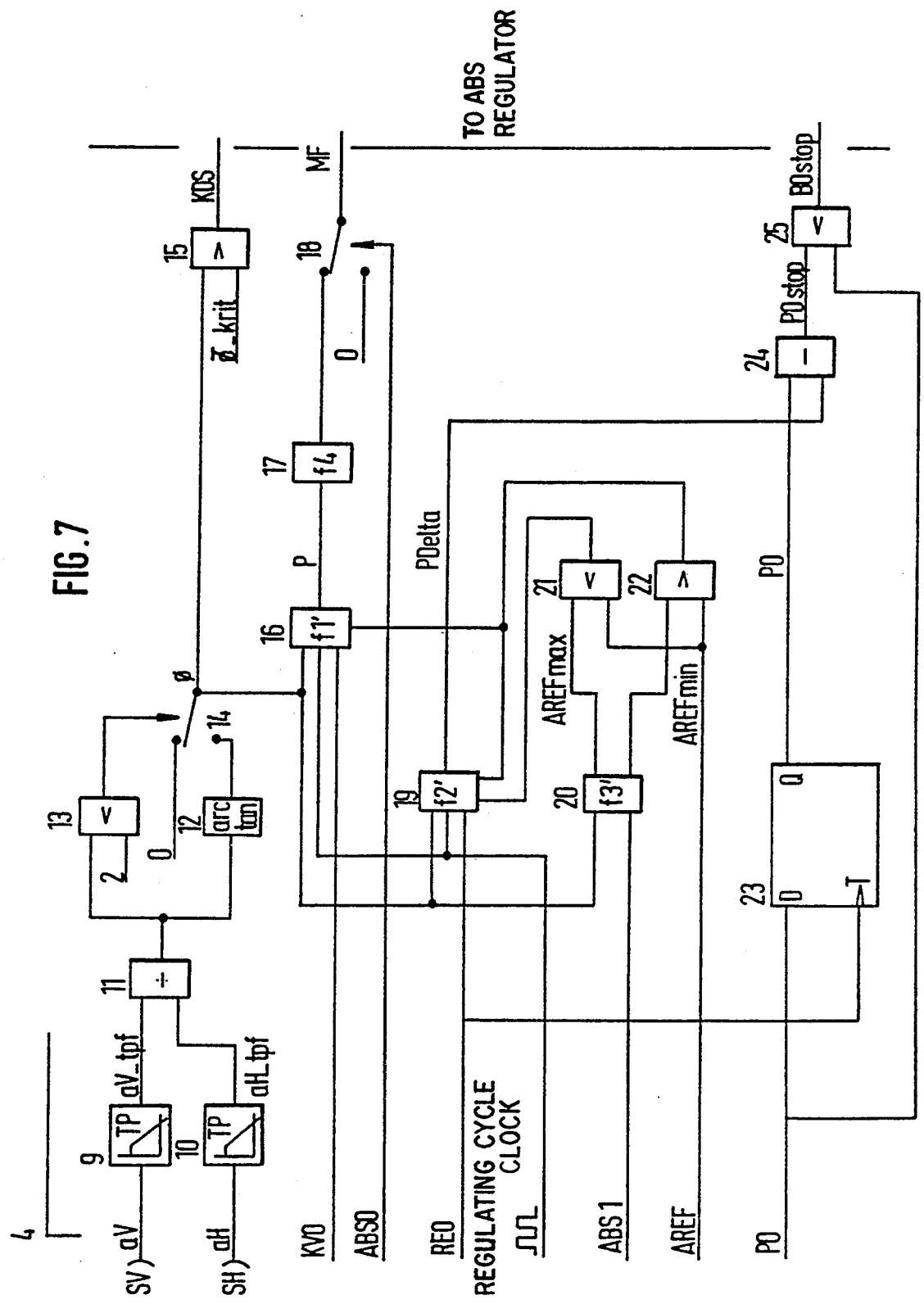

MOTORCYCLE ABS USING HORIZONTAL AND VERTICAL ACCELERATION SENSORS

BACKGROUND AND SUMMARY OF THE INVENTION

The present invention relates to antilock braking systems for motorcycles, having wheel sensors and a monitoring circuit that detects overbraking states from the sensor signals and generates corresponding control signals, and a pressure modulator which adjusts the brake pressures at the two vehicle wheels through the control signals.

Since motorcycles absolutely require sufficient lateral guiding force on curves, brake applications on curves are nearly impossible in the boundary area because the braking forces applied in the lengthwise direction result in a pronounced reduction of the cornering forces of the tires. Of course, controlled brake applications on curves are especially problematical, since every ABS system repeatedly causes brief wheel overbraking states as a result of cyclic pressure application or applies a braking pressure that is at least in the vicinity of the lockup pressure. During these brief phases, the cornering force of the overbraked wheel drops sharply towards zero, so that a vehicle in a tilted position would slide laterally. In addition, the braking forces in the tilted position produce strong erecting moments which the rider must compensate in order to force the inclined position.

Even when the cornering forces would suffice, the pronounced pressure modulations required to correct for wheel overbraking states would cause the rider to make major steering torque changes that occur abruptly at points in time that are not foreseeable, so that the vehicle readily becomes unstable. The antilock braking systems in practical use cycles between the control states "release pressure," "maintain pressure," and "increase pressure" for each wheel.

A pressure release usually occurs whenever the wheel in question exceeds a maximum permissible delay value with sufficiently high slip. This situation occurs at points in time TOein_i.

The pressure is maintained (to the extent possible with the system) when the wheel makes the transition from the previous deceleration to the acceleration phase, in other words, moves in the direction of stable slip ranges (occurs at points in time TOhalt_i ). The pressure is increased again when the wheel again clearly enters stable slip (points in time TOaus_i), with at least one large pressure jump taking place first, followed by a continuous increase in pressure with a constant gradient (referred to as the "pressure buildup phase" or "reloading phase" in the following), until a wheel acceleration interruption caused by this occurs again and initiates a pressure decrease phase.

When a wheel speed interruption is detected by this method, the wheel has, with a high degree of probability, already exceeded the peak of the $\mu$-slip curve, so that the drive provided by the wheel as a function of the road is decreased by an amount that is directly proportional to the degree to which the wheel enters unstable slip. In order to readjust the wheel speed, a reduction by a relatively large pressure value is required so that this feedback effect is counteracted.

While braking on a curve in a sharply inclined position, the rider must compensate for a high steering torque since the wheel contact spot is displaced from the center of the tire toward the edge on the inside of the curve. The magnitude of the steering torque increases linearly with braking force. If pronounced pressure modulations lead to brief, considerable fluctuations in the steering torque curve, the rider will no longer be able to apply a corresponding counter torque at all times. With a poor or excessive steering reaction, the vehicle can very easily become unstable.

German Patent Document 42 04 350.6 describes a method by which wheel overbrakings can be avoided or at least considerably delayed in time. When this is done in such a way that the front wheel is actually kept permanently within slip ranges, which precede the maximum friction value ($\mu$-maximum), the vehicle remains stable even when traveling around a curve, with only minor steering torque changes affecting the rider and simultaneously producing nearly optimal deceleration. However, the method suffers from the disadvantage that when the vehicle is sharply inclined there is insufficient reserve cornering force, since the maximum deceleration is exhausted practically permanently. Even with a minor change in the coefficient of friction like that which can occur locally even on surfaces that appear homogeneous, in the final analysis brief wheel overbraking is possible, with the above-mentioned negative accompanying phenomena.

An important problem in antilock braking systems adjusted for curves lies in the reliable recognition of travel around a curve and a sufficiently accurate measurement of the angle of inclination. The methods described in German Patent Document 38 39 520 relate to measurement of the dynamic wheel erecting forces which, in contrast to the statically measured values, increase as the tilt increases. In addition, the tilting moments of a wheel which is traveling in a tilted position are evaluated to measure the degree of tilt, with the tilting moments being determined by different wheel erecting forces on the left and right sides of the wheel. In order additionally to ensure recognition of travel in a tilted position, a specific temporary steering angle pattern is used.

The methods described, however, are subject to high measuring technology expense and do not always provide an unambiguous result.

For example, measurement of the tilting moments requires two force measuring bearings. In addition, the wheel tilting moments depend not only upon the degree of tilt but also on the type and condition of the tires. Furthermore, uncertainty in steering angle pattern recognition is very great since the patterns vary considerably as a function of vehicle speed and rider behavior. Because of the pronounced tread, especially in wide tires, there is no clear relationship between the assumed steering angle and the existing tilted position of the vehicle.

In German Patent Document 38 39 520, as a reaction to recognized travel on a curve, a threshold value for the activation of the antilock braking system is changed with the goal, even at low wheel slip values, of entering the pressure reduction phase.

A measure of this kind, however, will not suffice in many critical situations to ensure sufficient cornering stability. When traveling on extreme curves, the front wheel brake pressure in particular must be kept far below the lockup value, so that the vehicle does not slip sideways. Slip values that clearly indicate overbraking can lead to insufficient cornering forces. The goal of the invention therefore is to provide an antilock braking system for motorcycles in which, once travel on a curve has been clearly recognized, a modified antilocking system is activated that adjusts itself dynamically to the degree of tilt reached.

This and other objects are achieved by the present invention which provides an antilock braking system for a motorcycle having front and rear wheels, comprising wheel sensors that output signals; a monitoring circuit coupled to the wheel sensors to receive the sensor output signals, and which detects overbraking states from the sensor output signals and generates corresponding control signals; a pressure modulator coupled to the monitoring circuit which adjusts brake pressures at the two wheels in response to the control signals; a curve pressure control, coupled to the monitoring circuit, that recognizes travel on curves and controllable regulated braking on curves, said curve pressure control having two acceleration sensors to determine the tilt angle $\Phi$ of the vehicle and, if this angle exceeds a critical threshold $\Phi$ krit, causes the monitoring circuit to maintain, via the control signals, the brake pressure at the front wheel before an anticipated lockup pressure is reached.

According to the invention it is proposed to detect travel on a curve and the degree of tilt using two acceleration sensors. Suitable sensors are currently available as semiconductor components that can be used directly with the ABS electronics and involve only minor expense relative to the total cost of the antilock braking system. The primary focus of the invention, however, is not recognition of the tilted position, but reaction to the recognized situation.

The method according to the invention for vehicle stabilization therefore provides comprehensive measures such that, once the tilted position of the vehicle has been detected, the entire antilock braking strategy outside and inside regulated brakings are adjusted to the degree of tilt.

The entry phase is critical for safe braking pressure control. If the front wheel is overbraked once the tilted position exists, it is important for the ABS not to be actively switched on until a wheel locking tendency is recognized, since then only very small cornering forces appear, at least for a short time, which could lead to a fall. Therefore, even before the appearance of the first locking tendencies, an effort must be made to ensure that the wheel brake cylinder pressure on the front wheel does not exceed certain maximum values that must be calculated depending on the degree of tilt recognized.

The strategy followed during active antilock braking to stabilize the vehicle is based upon German Patent Document 42 15 350.6 in which it is proposed to increase the wheel braking pressure in the reloading phases exponentially to the wheel lockup pressure POein stored previously, with the pressure at the beginning of such reloading initially being increased sharply and then increasingly gently with respect to the anticipated lockup pressure POein. The flat pressure curve in the vicinity of POein prevents the wheel with high dynamics from being braked into the unstable slip range. By means of a pressure minimum increase that is required at the end of the reloading phase, POein is reliably achieved once again following a predetermined maximum time.

The curve pressure control according to the invention provides for raising the pressure in the reloading phase exponentially, once again according to German Patent Document 42 15 350.6, but stopping the pressure rise before reaching the previous lockup pressure POein and keeping the pressure constant. The difference between the holding pressure POstop and the lockup pressure POein therefore depends on the braking situation. The greater the tilted position of the vehicle that is reached, the greater the pressure differential that will be chosen, so that a rising cornering force reserve is guaranteed with the increase in tilt.

Therefore, in controlling the pressure on curves, in contrast to the mechanisms in German Patent Document 38 39 520, the present invention provides a component that can predict far in advance, that adjusts itself very flexibly to the existing road and steering conditions and gives the vehicle being braked on a curve sufficient riding stability with very good steadiness.

The advantages of the invention therefore include: reliable recognition of the tilted position of a vehicle; prevention of wheel overbraking state; ensuring sufficient vehicle deceleration; and rapid pressure adjustment in changing situations.

Other objects, advantages and novel features of the present invention will become apparent from the following detailed description of the invention when considered in conjunction with the accompanying drawings.

BRIEF DESCRIPTION OF THE DRAWINGS

FIG. 5a shows functions Pab=f1 ($\Phi$) with a family of correction curves.

FIG. 5b shows the function AREFmin=f3 ($\Phi$).

FIG. 6 is a graph against time of a controlled brake application with active curve pressure control.

FIG. 6a shows the function PDelta=f2 ($\Phi$).

FIG. 7 shows the wiring diagram of a embodiment of the pressure control of the present invention on curves.

DETAILED DESCRIPTION OF THE DRAWINGS

Figure 1:
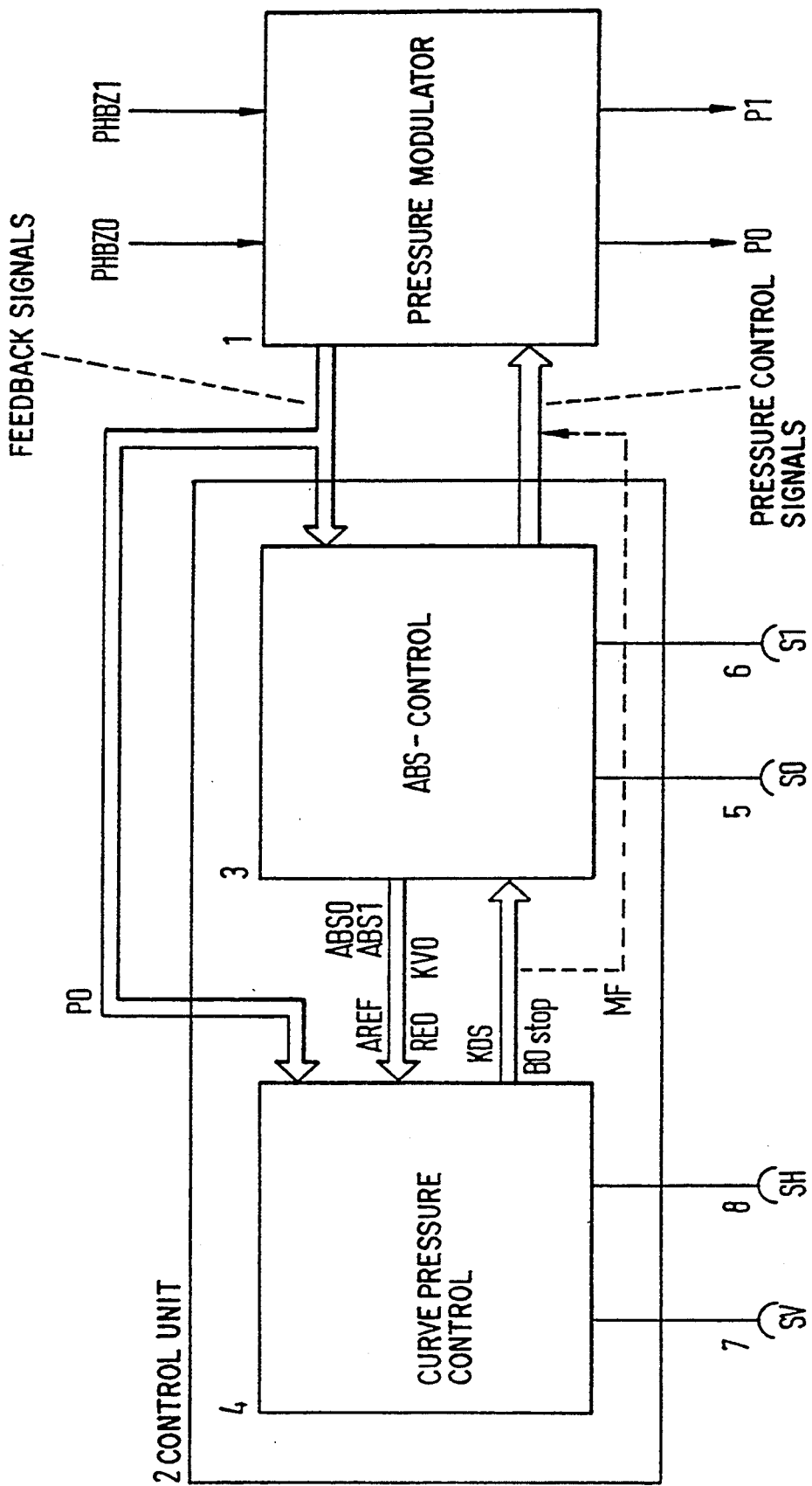
FIG. 1 is a functional diagram of the antilock braking system constructed in accordance with an embodiment of the present invention.

The description of the present invention uses the following terms and symbols defined below. S0=the signal from the inductive front wheel sensor which permits determination of the respective front wheel circumferential velocity. S1=the signal from the inductive rear wheel sensor which permits determination of the current rear wheel circumferential velocity. V0=-the current front wheel speed (from the wheel sensor signals, an ABS control forms the current wheel circumferential velocity for each control cycle). V1=current rear wheel speed. VF=real vehicle speed (unknown to the ABS and the curve pressure control). PHBZO=brake master cylinder pressure of front wheel channel. PHBZ1=brake master cylinder pressure of rear wheel channel. PO=wheel brake cylinder pressure on front wheel (this pressure is adjusted by the ABS control during controlled braking; the mechanisms shown here can indirectly influence the PO through the ABS control) . P1=wheel brake cylinder pressure on rear wheel. POstop=maximum permissible front wheel pressure on curves during active ABS control. G=weight of vehicle (including rider and load). FZ=centrifugal force acting on the vehicle during travel on a curve (including rider and load). FR=total force resulting from G and FZ. Pab=POmax=maximum tolerable front wheel braking pressure for travel on curves outside active ABS control. MF=motor torque acting on the piston in the case of a piston pressure modulator. FF=restoring spring force for the piston pressure modulator. PF=force acting on the piston of the pressure modulator because of the RBZ pressure. z=position of piston. MFab=torque MF, which leads to the separation of wheel brake cylinder (RBZ) from master brake cylinder (HBZ) and thus includes Pab in RBZ. VREF=calculated vehicle reference speed (generated from filtered wheel speeds and plausibility consideration). AREF=filtered vehicle deceleration time derivative of VREF which however varies very sharply because of the short control cycle times. For this reason filtration of this signal is generally employed. (AREF is assumed to be such a filtered vehicle deceleration). ABSO=indicator signal for an active ABS control on the front wheel (Boolean 1-bit signal, which is at logical 1 when the front wheel is being actively braked under control). ABS1=indicator signal for an active ABS control on the rear wheel (Boolean 1-bit signal, which is at logical 1 when the rear wheel is actively being braked under control). REO=indicator signal for a front wheel overbraking (Boolean 1-bit signal) which is at logical 1 when unstable slip occurs at the front wheel. $\Phi$=tilt angle of the vehicle. $\Phi\_krit$=- limiting value of the tilt angle which, when exceeded, causes the curve pressure control to be switched to active. $\Phi\_ext$=extreme tilt angle (serves to generate limiting functions). a=centrifugal acceleration operating when traveling around a curve. aV=portion of ca detected by an acceleration sensor mounted vertically on the vehicle. aH=portion of ca detected by an acceleration sensor mounted horizontally on the vehicle. aV_tpf=lowpass filter aV. aH_tpf=lowpass filter aH. Control cycle clock=clock signal switched with the duration of an ABS control cycle (8 ms in this case)>125 Hz. $\mu$=coefficient of friction between tires and road. TOein=point in time at which a tendency toward lockup caused by overbraking occurs in the front wheel. TOein_i=point in time at which a tendency to lockup appears in the front wheel within a controlled brake application for the i-th time. TOhalt-=point in time at which the front wheel is accelerated again after compensating for overbraking. TOhalt_i=-point in time in which the front wheel, after the i-th overbraking, is accelerated again within a controlled brake application. TOaus=point in time at which a tendency to lockup in the front wheel is eliminated by the ABS. TOaus_i=point in time at which a tendency toward lockup on the front wheel is eliminated within a controlled brake application for the i-th time. T=time interval for correction of functions Pab=fl ($\Phi$) and PDelta=f2 ($\Phi$). Tab =point in time at which the RBZ is separated from the HBZ. TOstop=point in time at which the control of pressure on the curve causes the ABS control to stop the pressure buildup in the reloading phase. PDelta=pressure differential by which the wheel lockup pressure in the reloading phase must be undershot. BOstop=control signal to the ABS control: causes the current braking pressure to be maintained. KDSakt=display signal for intervention of curve pressure control. AREFmin=minimum vehicle deceleration which, when undershot, results in a correction of curves Pab=fl ($\Phi$) or PDelta=f2 ($\Phi$). AREFmax=-maximum vehicle deceleration which, when undershot, causes a correction of the curve PDelta=f2 ($\Phi$). K1, K2, K3, K4, K5, K6, K7, K8=constants for generating the functions of curve control. TCNT=counter value for setting correction interval T. DPO=amount by which the ABS control reduces the front wheel pressure when the BOstop signal is applied. KVOin=indicator signal which the ABS control sets when the valve is opened between HBZ and RBZ in the front wheel channel. 1 g=acceleration due to gravity=9.81 m/s**2.

FIG. 1 shows a block diagram of an antilock braking system, comprising an electromechanical-hydraulic pressure modulator (1) and an electronic control unit (2) which, in addition to the components for ABS control (3) also incorporates an auxiliary circuit (4) which utilizes the above-mentioned strategy for control on curves and is therefore referred to as the "curve pressure control".

The function blocks (3, 4) can be provided both by special hardware and by software implementation.

In order to show the incorporation of curve pressure control into a normal antilock braking system, functional relationships of blocks (1, 3, 4) will now be described briefly. ABS control (3) receives pulse trains S0 and S1 from wheel sensors (5, 6). From the frequencies of these pulse trains the ABS control (3) calculates directly the actual circumferential speeds V0 and V1 of the two vehicle wheels. From V0 and V1 the ABS control (3) determines additional internal reference values, for example the vehicle reference speed VREF and the vehicle reference deceleration AREF, so that it can recognize overbraking states and eliminate them reliably. At an overbraking occurrence, the ABS control (3) sends pressure control signals to pressure modulator (1), which reduces the master brake cylinder pressures PHBZ0 and PHBZ1 set by the rider and sends P0 and P1 to the wheel brake circuits as the wheel brake cylinder pressures. The pressure modulator (1) provides feedback signals to the ABS control; this is information about the set braking pressures P0 and P1, in other words when a piston pressure modulator is used (such as in German Patent Document 35 30 280) , the pressure-determining positions of the piston. The internal reference signals can also be used by the curve pressure control (4).

The ABS control (3) then develops antilock braking control on the basis of known basic strategies. At the same time, the curve pressure control (4), once travel on a curve has been clearly determined, calculates optimum pressure points for the front wheel and transmits corresponding control signals to the ABS control (3), so that the ABS control (3) interrupts its basic control strategy and attempts to adjust the front wheel pressure points supplied by the curve pressure control (4). The ABS control (3) and the curve pressure control (4) therefore work in parallel. The basic functions of the ABS control (3) are assumed to be known here and will not be described in greater detail. The subject of the present invention relates to the functions of the curve pressure control (4).

In a practical implementation, the ABS control (3) and the curve pressure control (4) can be viewed as a single component. A logical separation is provided here only for the purpose of emphasizing the innovative functions of the curve pressure control (4).

Figure 3:
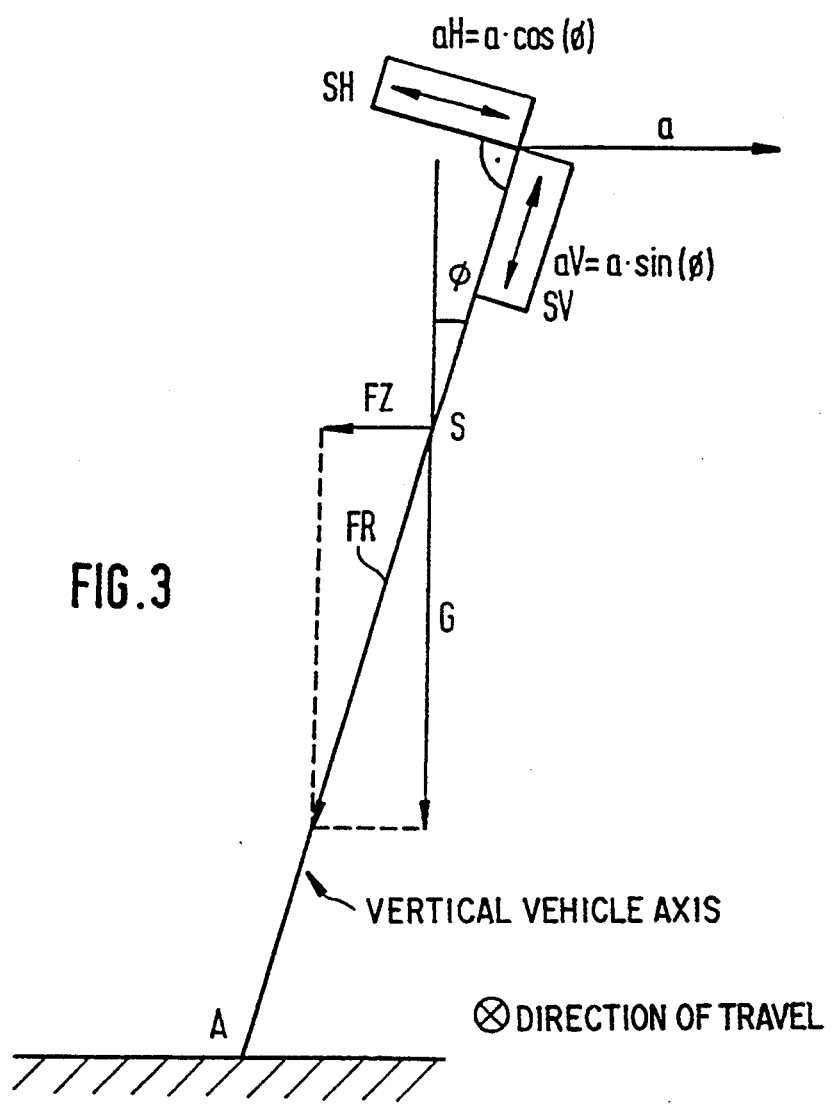
FIG. 3 shows the forces on an in-line vehicle and the mounting of acceleration sensors.

When an in-line vehicle travels around a curve (see FIG. 3) the centrifugal force FZ acting outward must be compensated by the force of gravity G with the aid of a corresponding tilted position such that the force resultant FR lies on the line connecting the center of gravity of the vehicle (S) and the wheel contact spot (A). If two acceleration sensors (SH) and (SV) are so mounted on the vehicle according to FIG. 3 that sensor (SH) measures the horizontal acceleration of the vehicle and sensor (SV) measures the vertical acceleration of the vehicle, the tilt angle Φ can easily be calculated from the two sensor values aV and aH.

$$aV = a^* \sin(\Phi)$$

$$aH = a^* \cos(\Phi)$$

$$\Phi = \arctan(aV/aH)$$

The clear curve recognition is the basic precondition for a problem-free superimposition of normal antilock braking control and curve pressure control. Since curve pressure control considerably intervenes in the operation of the antilock braking control and can lead to reduced front wheel brake pressures which are below the wheel lockup pressures, a curve pressure control can only be activated when the vehicle is definitely determined to be on a curve. It is therefore essential to avoid situations in which travel on a curve is improperly detected because of disturbing factors. The following disturbing factors can simulate travel on a curve: pronounced irregularities in the road that deliver impacts to the vehicle and therefore produce brief accelerations; vehicle vibrations; and normal brake application and acceleration procedures when traveling in a straight line.

In order to suppress the high-frequency interference caused by irregularities in the road and vehicle vibrations, a simple lowpass filtration of the two sensor signals will suffice:

$$\Phi = \arctan(aV\_tpf/aH\_tpf)$$

where aV_tpf = lowpass filtered aV
aH_tpf = lowpass filtered aH

Since the sensors detect only those accelerations that are perpendicular to the direction of travel, the static acceleration and braking processes of the vehicle do not have any effect; however, vehicle pitching movements, especially when applying the brakes hard and with pronounced changes in acceleration, are recorded by the vertical sensor (SV). Since the horizontal sensor (SH) in these cases does not deliver any value and the above-mentioned filtration suppresses the changes in the value of (SV) that occur in any case, the system will not erroneously detect travel on a curve if as an additional condition for the validity of the calculated tilted angle the following requirement is applied:

$$aH\_tpf > aV\_tpf/2$$

This eliminates all the disturbing factors which are created by low-frequency compression and expansion processes. At the same time however all tilt angles in the relevant range from 0° to approximately 63° are detected.

Figure 2:
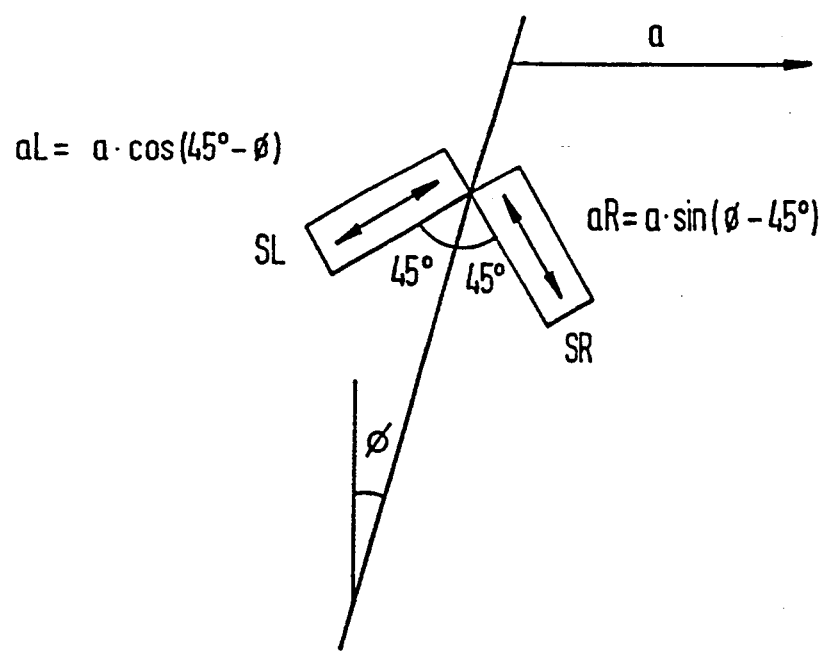
FIG. 2 shows the acceleration sensors mounted rotated through 45°.

In another embodiment of the invention, the sensors are mounted at an angle as shown in FIG. 2 of 45°. In this case, differences in the values of aL (from left sensor (SL)) and aR (from right sensor (SR)) indicate a tilted position. Signal components which are in phase in aL and aR, which can be attributed to normal acceleration or deceleration changes in the vehicle or traversing crests or troughs are eliminated by subtraction of the filtered sensor values:

$$\text{if } |aL\_tpf - aR\_tpf| < \text{threshold value}$$

therefore the vehicle is not on a curve.

If the threshold value is exceeded, the tilt angle is calculated using the following equations (see FIG. 2):

$$aL = a^* \cos(45° - \Phi) = a^* \cos(\Phi - 45°)$$

$$aR = a^* \sin(\Phi - 45°)$$

Lowpass filtration of aL and aR suppresses high-frequency interference and the anticipated results are obtained:

$$\Phi = \arctan(aR\_tpf/aL\_tpf) + 45°$$

Upon sharp braking in the tilted position, there is the danger that the vehicle will slide sideways before a normal antilock braking system detects a significant lockup tendency in the front wheel. The pressure-reduced intervention would therefore take place too late.

Hence, pressure reduction on the front wheel must begin even before the actual lockup process. This will permit the wheel to gain sufficient cornering force. However this intervention cannot take place in accordance with known mechanisms of wheel lockup recognition.

A reduction of the wheel deceleration thresholds in which a lockup tendency is recognized, is not sufficient in many cases since the rider, by spontaneous hard brake application, can briefly store a large pressure surplus in the wheel brake cylinder and thus achieve an extreme deceleration at the circumference of the wheel. Exceeding the threshold is then immediately accomplished in any case so that the ABS becomes active even without reduction of the threshold. However, before the ABS modulates the pressure so that the wheel again enters stable slip ranges, the vehicle may already have slid out of control. In addition, by the pronounced intervention of the antilock braking system, the rider must be able to compensate for the high steering moment changes that could lead to instabilities.

Therefore, a method is provided by the present invention in which, during recognized travel around a curve, depending on the tilt that has been reached, a maximum front wheel pressure POmax is not exceeded. As the tilt angle Φ increases, this maximum permitted front wheel braking pressure (referred hereafter as the limit pressure Pab) is reduced by a certain function:

$$Pab = POmax = f1\ (\Phi).$$

An important aspect for the continuous stability of the vehicle is the strict avoidance of front wheel braking pressures above POmax. An antilock braking system with high-speed pressure measuring technology and short valve closing times (1μ-range) could perform the task of pressure limitation with a sufficient degree of quality. However the additional expense of costly measurement technology must be taken into account.

Therefore an antilock braking system is provided which limits the front wheel braking pressure without the cost of measurement, immediately and mechanically, to an adjustable maximum value.

In antilock braking systems which work on the basis of the piston principle, the wheel braking pressures can be adjusted by position regulation of their piston. When the position of the piston is determined by a travel measuring device (as shown, for example, in German Patent Document 35 30 280), the ABS control is constantly provided with information about the relative pressure that has been reached.

Figure 4:
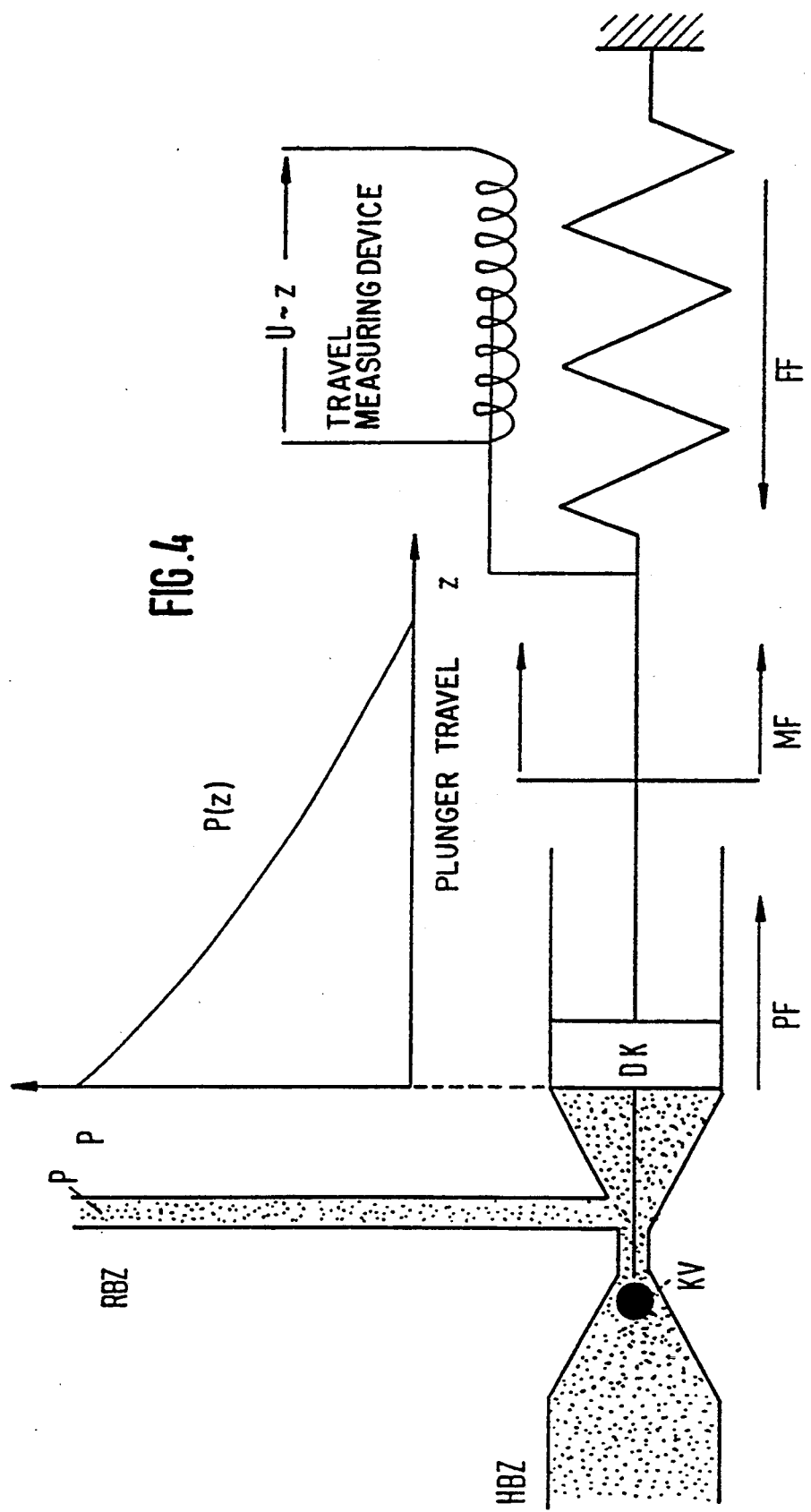
FIG. 4 is a schematic diagram of a pressure modulator according to the piston principle.

FIG. 4 shows the operating principle of a vehicle wheel. During a normal brake application, the pressure applied by the rider from the brake master cylinder (HBZ) is applied directly to the wheel cylinder brake circuit (RBZ). In the case of a detected overbraking, the ABS control controls a motor tractive force MF so that the piston (DK) is displaced by a lever against the force FF of a compression spring and, with the aid of internal pressure force (PF), to displace the piston in the direction of increasing piston travel z.

Even with a slight displacement of the piston (DK), ball valve (KV) closes, so that the wheel brake cylinder pressure is decoupled from the brake master cylinder pressure and the pressure Pab in the wheel brake circuit is enclosed.

The further the piston (DK) is displaced in the direction of travel z, the more the pressure is reduced because of the elasticities present in the brake system. Beginning with the enclosed pressure Pab, a pressure function that decreases relative to zero is passed over distance z, which, depending on the brake system, is linear to slightly digressive.

Another pressure rise is produced by sliding the piston in the direction of lower z-values. The motor torque MF is reduced so that the pressure FF of the spring again exceeds the sum of the active counterforces PF and MF as well as the passive frictional forces of the system. The path adjustment that has been made, with the aid of the pressure-travel function given, therefore directly represents a braking pressure relative to the enclosed pressure Pab. As long as ball valve (KV) remains closed, there is a clear relationship between piston travel z and braking pressure P.

According to FIG. 4, there is also a clear relationship between set motor torque MF and the pressure PF, at which ball valve (KV) closes:

$$PF = FF - MF.$$

In addition the relationship between this pressure PF and the enclosed pressure Pab over the geometry of the piston is known:

$$Pab = PF/A,$$

where A = piston cross-sectional area.

If a certain wheel brake cylinder pressure must not be exceeded, a corresponding motor torque force is set for which the desired limit pressure is valid:

$$MFab = FF = A*Pab.$$

When travel around a curve is recognized, even without the presence of any wheel lockup tendencies, by pre-energization a motor tractive force MFab is set, it is clearly ensured that even with sudden application of the brake, no higher wheel brake cylinder pressure than Pab can be supplied to RBZ.

Figure 5:
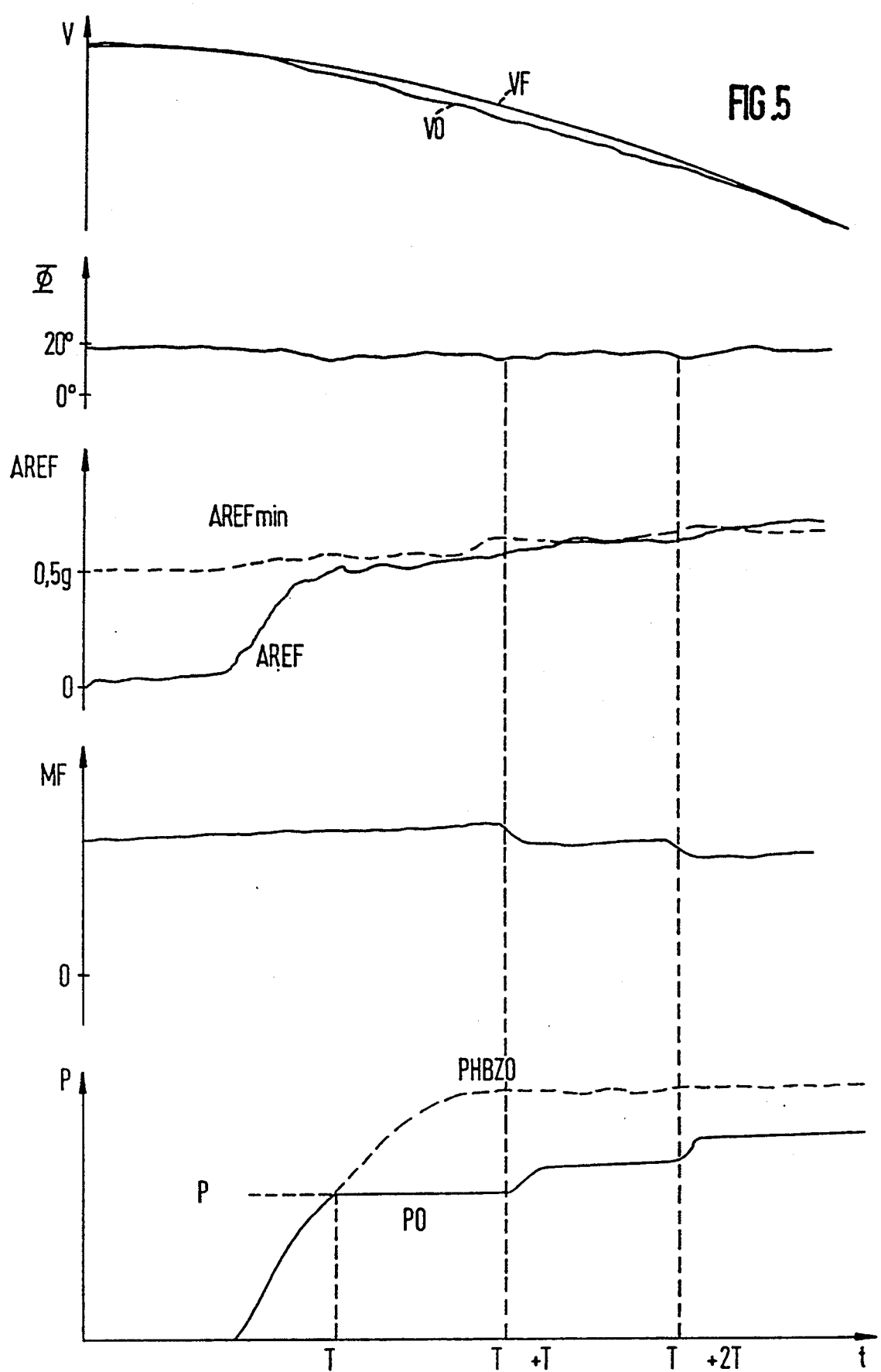
FIG. 5 is a graph against time of a brake application in which control of pressure on a curve produces an active pressure restriction on the front wheel.

FIG. 5 shows the time curve of an abrupt brake application during travel around a curve. The front wheel brake pressure PHBZ0 stored by the rider in the HBZ is initially conducted to RBZ without limit. Since the curve pressure control has already recorded a definite tilted position for the vehicle, when the value Pab is exceeded at point in time Tab, RBZ is separated from HBZ so that PO is then kept at a constant value Pab.

The front wheel speed signal VO at point in time Tab still shows no lockup tendencies at all. Activation of the ABS and the front wheel pressure limitation are therefore provided here solely because of the curve situation that has been recognized.

FIG. 5a shows the maximum permissible limit pressure Pab as a function fl of the tilt angle $\Phi$. The absolute pressure values of course must be adjusted for the brake type of the vehicle in question. Additionally, consideration must be given to the fact that with an abrupt brake application, initially the full front wheel erecting force of the subsequent compressed state is not yet present, so that the lockup pressure of the front wheel at the beginning of the brake application is relatively low. The sample values in FIG. 5a refer to a typical vehicle of the 1000 cc class with front wheel dual disk brakes. In general, for small tilt angles below $\Phi\_krit$ (10° in this case) no limitation of the brake application pressure is provided. Between $\Phi\_krit$ and an extreme tilted position $\Phi\_ext$ (45° here) which can still be managed on a surface with good adhesion, limit pressure Pab is reduced linearly from an upper value Pab ($\Phi\_krit$) (20 bar here) to a lower value Pab ($\Phi\_ext$) (10 bar here). With a further increase in the tilt, the minimum limit pressure Pab remains constantly at the value Pab ($\Phi\_ext$).

$$Pab = Pab\ (\Phi\_krit) - K1 * (\Phi - \Phi\_krit)$$

for $\Phi\_krit < \Phi < \Phi\_ext$
with $$K1 = (Pab(\Phi\_krit) - Pab(\Phi\_ext))/(\Phi\_ext - \Phi\_krit)$$

$Pab = Pab\ (\Phi\_ext)$
for $\Phi > = \Phi\_ext$.

Instead of the linear function between the corner points Pab ($\Phi\_krit$) and Pab ($\Phi\_ext$), other functions (exponential functions for example) could be chosen.

By changing the braking characteristic (especially as a result of fading following frequent braking applications) and as a result of aging of the brake disks and or linings, the relationship between the wheel cylinder braking pressure and the effective acting braking force changes as well. When pronounced fading effects develop, the above-described mechanism of the pressure maintenance to Pab can lead to underbraking phenomena since the wheel lockup pressure is now too far above Pab.

Hence, an expanded mechanism is provided by the present invention which increases the initially constant limit pressure Pab when the calculated vehicle reference deceleration AREF goes below an anticipated value AREFmin. The increase in the Pab function (as shown in FIG. 5a by the family of curves) takes place in small steps, beginning with the static curve, for a fixed time T:

$$Pab\ (t+T) = Pab(t)*(1+K6)$$

for $K6 << 1$.

As a result of the displacement of the entire curve, the system can react to a change in $\Phi$ as well. The stepwise shift of the Pab curve takes place until AREF exceeds the limiting value AREFmin. This takes advantage of the fact that the front wheel, because of underbraking, enters a state of very slight slip and in practice reflects the real vehicle speed VF. Calculation of AREF is therefore very reliable and can be evaluated a very short time after a pressure change.

FIG. 5 for example shows the graph versus time of braking on a curve in which the front wheel brake pressure PO at time Tab initially is limited to a value Pab that corresponds to the tilt $\Phi$. At time t=Tab+T it is determined that the vehicle deceleration that has been reached, AREF, is below the minimum anticipated value, AREF min. The shift of the Pab curve then means that the enclosed pressure PO is too low, so that, by briefly opening the valve between HBZ and RBZ, PO is increased to the new Pab value. In the case of the plunger modulator according to FIG. 4, this pressure adjustment is accomplished very simply by adjusting a motor tractive force MF corresponding to the new Pab value. Ball valve (KV) will then open briefly until the increased RBZ pressure PO results in a new equilibrium and the valve again closes automatically.

In the example shown in FIG. 5 Pab is again increased at point in time t=Tab+2T, with the vehicle achieving the desired minimum deceleration AREFmin.

The altered Pab function could be stored in theory and used for later brake applications on curves as a basic function. However, there is then the danger that because of an intermediate cooling of the brakes, the above fading effects would disappear so that the limit pressure Pab would now be too high and lead to wheel lockup tendencies.

Therefore it is a good idea to store the changed Pab function only in a volatile memory. When the ignition is turned on again, only the Pab function that is stored in the permanent memory is available as a starting function.

As long as the ignition is switched on, it is advantageous to reduce the Pab function that was changed during braking on a curve slowly over time until the static curve is reached once more. Then, when the brakes are applied again on a curve, the already corrected Pab function can serve as a starting function.

Another problem lies in the determination of the minimum deceleration requirement AREFmin. In general, a higher deceleration is required for a slight tilt. When it is considered that a greater tilt is only physically possible with high and medium frictional values, the mechanism described can be limited to the practically relevant braking situations on dry or wet asphalt or concrete. Accordingly, the Pab function is already set which is based on the fact that the $\Phi$-dependent limit pressures do not yet lead to lockup of the wheel. If a brake application on a curve takes place at low friction values, the mechanism of the pressure-conditioned control would not be involved, since before the limit pressure is reached a wheel lockup tendency would occur. Provision is made here to demand minimum deceleration according to the function in FIG. 5b:

$$AREFmin = AREFmin(\Phi\_krit) - K3*(\Phi - \Phi\_krit)$$

for $\Phi\_krit < \Phi < \Phi\_ext$ with $$K3 = (AREFmin(\Phi + krit) - AREFmin\ (\Phi\_ext))/(\Phi\_ext - \Phi\_krit)$$

AREFmin = AREFmin $(\Phi\_ext)$ for $\Phi > = \Phi\_ext$.

In addition, it must be taken into account whether the rear wheel is braked at the same time. A test is made to determine whether the rear wheel ABS control is active. In this case AREFmin is increased by a correction factor:

$$AREFmin = AREFmin*1.2$$

The unregulated case of rear wheel braking is not taken into account, since it is assumed that a rider, upon a strong front wheel application in a tilted position, cannot apply any significant rear wheel pressure that does not lead to overbraking of the rear wheel, since the lockup pressure on the rear wheel is very low in such cases.

A critical braking situation in the extreme range then occurs when a motorcycle is braked sharply just as it is straightening out, so that the antilock braking device becomes active and travel on a curve is then initiated during the regulated braking. The problem consists in the fact that the wheel braking pressures could be too high while entering the curve. In this case for example a greater slip tendency can immediately occur on the front wheel for example, which must then be eliminated using the normal ABS control. A case may occur such that the degree of the required pressure modulation leads to considerable steering moment fluctuations which the rider cannot control, so that the vehicle becomes unstable. However, when travel on a curve is recognized before another wheel speed interruption occurs, the curve pressure control can completely suppress additional wheel lockup tendencies by causing the ABS control to keep the front wheel braking pressure in the reloading phase below the last lockup pressure detected.

FIG. 6 shows the graph versus time of a braking process in which, at point in time TOein_2, a lockup tendency shows up in the front wheel. After adjustment, the new pressure buildup starts at point in time TOaus_2 in order to reach a good pressure level again. In this reloading phase (pressure buildup phase) the normal ABS control, through careful pressure increases, attempts to approach the previous wheel lockup pressure. Under homogenous ground conditions this point is a pressure point that is slightly too high which, if reached, would lead to a tendency for the wheel to lock up once again. The mechanism therefore provides for not increasing the braking pressure PO to the lockup pressure POein again, but only to reach a pressure value which is below POein by a certain amount PDelta.

In FIG. 6, the curve pressure control starts the ABS control at point in time TOstop, to terminate the pressure buildup, since the pressure PO has reached the value POein−PDelta. Under homogenous ground conditions this pressure value will lead to no further front wheel lockup tendency, so that the rider, in the further course of braking, does not have to overcome any major fluctuations in the steering moment. If the vehicle tilt $\Phi$ were to increase further, the pressure point already reached would be too high. Therefore the ABS control reduces the front wheel braking pressure PO by a small DPO in each regulating cycle in which the curve pressure control keeps the signal set. With a constant $\Phi$, therefore, there is a constant alternation between pressure increase and decrease by small amounts as shown in FIG. 6. As a result of the pressure reduction, PO keeps falling below the comparison value POstop, so that the curve pressure control is inactive and the ABS control continues normal pressure buildup. As a result, however, PO exceeds the value POstop again so that the curve pressure control again becomes inactive. As a result of this sawtooth pressure buildup and decrease, a constant pressure level is maintained.

With a change in $\Phi$ (beginning at T1 in FIG. 6), the increase in PDelta results in a decrease in POstop. The curve pressure control then applies the signal POstop until the ABS control has reduced the pressure PO below the specified value POstop by a stepwise decline. Correspondingly, with a reduced tilt (at T2 in FIG. 6) there is an increase in POstop so that the ABS control again continues its pressure buildup. ABS control (3) and curve pressure control (4) therefore operate in parallel.

When an overbraking situation occurs, the ABS control (3) takes over control and regulates the braking pressure by suitably controlling the pressure modulator. In the event that travel on a curve is recognized, the curve pressure control calculates the reliable maximum pressure points and prevents the ABS control from exceeding them in the reloading phases. The amount of PDelta by which the lockup pressure POein must be undershot is calculated by the curve pressure control based on the measured tilt angle $\Phi$. For this purpose according to FIG. 6a the following function PDelta=f2 ($\Phi$) is chosen:

$$PDelta = PDelta(\Phi\_krit) + K2*(\Phi\_krit)$$

for $\Phi\_krit < \Phi < \Phi\_ext$
with $$K2 = (PDelta(\Phi\_ext) - PDelt(\Phi\_krit))/(\Phi\_ext - \Phi\_krit)$$

PDelta=PDelta($\Phi\_ext$)
for $\Phi > = \Phi\_ext$.

Even with this pressure maintenance mechanism, for the sake of safety, a minimum vehicle deceleration AREFmin according to FIG. 5a is required. If AREF at point in time t=Toaus+T undershoots the minimum value AREFmin, PO is increased by a small amount. This is accomplished indirectly by changing the above function (see the family of curves in FIG. 6a):

$$PDelta = PDelta*(1 - K7).$$

After a further elapse of time correction interval T, in other words at point in time t=TOaus+2T, there is another comparison of AREF with AREFmin. If AREF has gone below the value AREFmin, the front wheel pressure PO that has been reached is maintained, otherwise there is a further pressure drop with a renewed correction of the PDelta curve. The corrected PDelta curve remains relevant only until a new front wheel lockup trend is detected. Then the point of departure becomes the basic curve since the road conditions may have changed. By displacement of the PDelta curve, it is also possible to react once again to changing tilt angles $\Phi$.

When the tilt angle of the vehicle during a controlled brake application is changed, after the above pressure retention mechanism has become effective, PO, using the function in FIG. 6a, is corrected to the value POein−PDelta, with the AREF check and possibly the correction of the curve taking place permanently. This results in a reduction of PO when the tilt angle $\Phi$ increases. Accordingly, PO increases when $\Phi$ decreases so that the vehicle again reaches a deceleration that is appropriate for the new braking situation. The aim of this measure is to provide the rider, in the case of an increasing tilt $\Phi$, at the expense of a somewhat deteriorated vehicle deceleration, a higher degree of cornering force at the front wheel, whereby no overbraking states are to appear if possible at the front wheel. It is only when the tilt is less that a measurable front wheel lockup tendency can be risked once again by increasing PO.

If the pressure behavior during braking on a curve should lead to a gradual increase in vehicle deceleration, despite the constant braking pressure there is an increased risk of lockup for the front wheel. In order to counteract the negative results of this effect, it is proposed to correct the function PDelta=f2 ($\Phi$) upward if the vehicle reference deceleration AREF exceeds a high threshold value AREF max (see FIG. 6a). The permissible maximum deceleration AREFmax is formed by multiplication of AREFmin by a constant factor:

$$AREFmax = K5*AREFmin$$

with K5>1.

Hence the goal of the curve correction is to keep vehicle deceleration in the bandwidth which depends upon $\Phi$ and is shown in FIG. 5b. If the ground conditions do not have a sufficient coefficient of friction, despite the preventive measures of pressure limitation and deceleration regulation, lockup tendencies may develop in the front wheel. In such cases the normal ABS control becomes active and sets pressure values that are below the level of the minimum values required by the curve pressure control, so that the actions of the ABS control dominate and curve pressure control is temporarily rendered ineffective. In all of the above considerations it was assumed that the RZ pressures are known. With the aid of brake pressure sensors, it would be theoretically possible to measure permanently the absolute RBZ pressures. With the above-mentioned piston pressure modulator, however, all pressure relationships can be derived directly from the piston travel positions without additional expense and without delay: all of the pressure values used previously therefore can be replaced by travel values z which for example are delivered by an inductive travel measuring coil according to FIG. 4; all pressure differentials (pressure decrease and pressure buildup gradients) are replaced by path segments. In addition the absolute braking pressures are known at all times since they can be calculated directly from the required motor torque.

FIG. 7 shows an exemplary embodiment of a circuit constructed in accordance with the present invention. Lowpass filters (9) and (10) filter the high-frequency noise and jitter components of the acceleration sensors (SH) and (SV) and thus generate one horizontal and one vertical acceleration signal. The dividend (11) provides the quotient of the vertical signal aV_tpf and the horizontal signal aH_tpf. The function generator (12) calculates the arc tangent of the quotient and hence the measured tilt angle Φ of the vehicle. If the horizontal acceleration is sufficiently great that the quotient aV_tpf undershoots threshold value 2, comparator (13) switches multiplexer (14) in such a way that the multiplexer (14) conducts angular value Φ to comparator (15). If no sufficient horizontal deceleration is present, (14) conducts the constant angle value 0. Comparator (15) checks to see whether Φ is below the critical tilt angle Φ_krit. In this case the curve pressure control reports to the ABS control (3) actively with a signal KDSakt. If KDSakt is a logical 0, the ABS control (3) ignores all the data supplied by the curve pressure control (4), since no significant tilt is present and, in the case of wheel overbraking, only the normal antilock braking protection is active.

When the ABS is not performing any front wheel control, the curve pressure control (4), with the aid of function generator (16), determines a maximum front wheel braking pressure Pab that depends upon the actual tilt Φ. With the aid of a modulator-specific operating function generator (17) this limit pressure is converted to a motor torque force MF to control the piston pressure modulator described above and, with the aid of multiplexer (18) is delivered to the pressure modulator or transferred as a logical value to the ABS control (3), which then controls the pressure modulator in the desired fashion. Hence, the variable MF, depending on the suitable implementation possibility, is either a physical value which directly controls the pressure modulator used or only an indicating signal to the ABS control (3) which in turn takes over control. If the ABS system is regulating the front wheel channel actively (ABSO='1'), an overbraking state must have occurred already on the front wheel so that the preventive measure of limiting the front wheel pressure is ineffective. In this case multiplexer (18) outputs a value MF=0, whereupon the ABS control (3) ignores the mechanism.

Figure 7A:
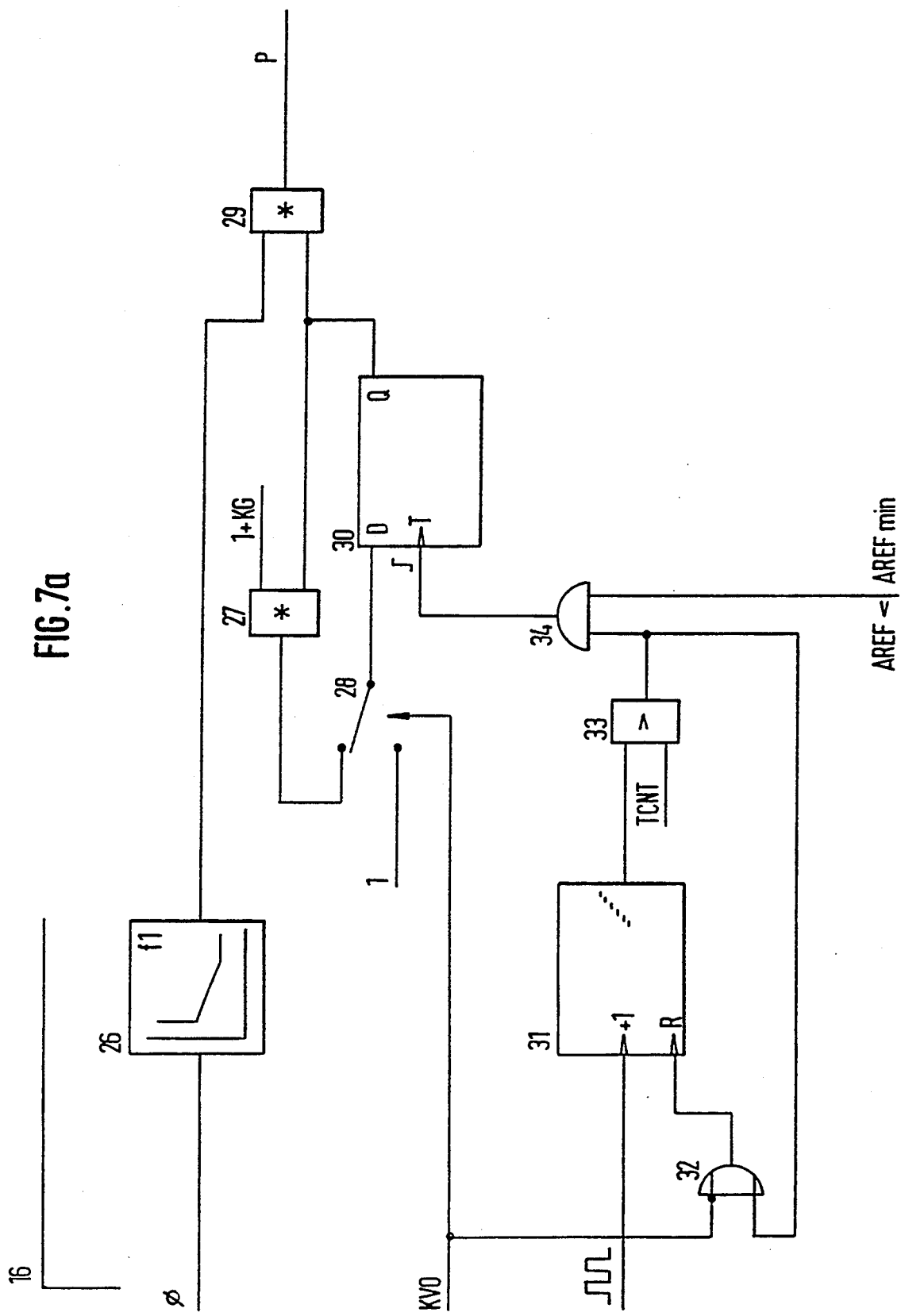
FIG. 7a shows an embodiment of the wiring diagram of the function Pab=f1 ($\Phi$).

An exemplary embodiment of a circuit for formation of the Pab function is shown in FIG. 7a and comprises sub-blocks (21) to (34). Static basic function Pab=fl (Φ) is generated by function generator (26). The other blocks (27) to (34) serve for dynamic function correction for the case described above, such that pressure regulation on the basis of the basic function, because of a changed braking characteristic, does not lead to the required minimum deceleration (AREFmin). For this purpose the register (30) contains a correction factor by which the value output by function generator (26) is increased with the aid of multiplier (29). So long as no pressure regulation takes place, the ball valve of the front wheel is open (KVOin='1'), and the multiplexer (28) switches the value 1 to the register (30) so that in effect no functional correction takes place. When a curve-controlled front wheel pressure decrease is initiated, the signal KVOin changes from '1' to '0' so that multiplexer (28) switches and applies the value 1+K6 delivered by multiplier (27) to the register input. This new correction factor, however, is not added to register (30) if a positive signal slope is present at clock input (T). For this purpose, the counter (31) receives at its reset input (R) over the negating input of OR gate (32) a positive reset pulse when the signal KVOin changes from '1' to '0'. During the time which follows, counter (31) is counted upward with the regulating cycle clock until its counter status reaches the comparison value TCNT. Then comparator (33) generates a '1' at its output and resets counter (31) to 0 through the OR gate (32), so that the counting process proceeds repeatedly. At the same time, with the brief '1' at the output of comparator (33) the required flank for taking over the correction value from the AND gate (34) is produced only, and only then, when the AND gate (34) conducts, i.e. a logical '1' must also be present at the right-hand input of (34). This is precisely the case when the vehicle reference deceleration AREF falls below the required minimum value AREFmin. Hence, blocks (31), (32), and (33) form a timer circuit which delivers a signal slope with the beginning of the front wheel pressure control each time a short time interval T expires, said circuit feeding a new function correction value into the register (30) if the vehicle does not yet have the required minimum deceleration AREFmin. Time T can be adjusted by comparison value TCNT and the regulating cycle clock. When, for example, a check of AREF or a correction of the function is supposed to take place every 80ms (T=80 ms) and the control cycle time is 8 ms, the comparison value TCNT must be set to 9. After n correction steps, register (30) contains the value $(1+K6)^{**}n$, since the stored value, upon each correction, is increased by the multiplier by a constant factor (1+K6). The signal KVOin, which initiates the testing and correction process, is transmitted here from the ABS control to the curve pressure control. This takes its departure from the fact that the ABS control sets the signal to logical '1' when the ball valve of the front wheel channel is open, which is determined in the plunger modulator which forms a basis here simply on the basis of the measurable piston position. When the limit pressure is exceeded, the valve closes because of the supporting motor tractive force automatically. This assumes that the ABS control records this process on the basis of the piston travel and accordingly sets the signal KVOin back to '0'. Then the ABS control KVOin will reset to '1' only after the valve has again opened for a longer period of time, approximately 100 ms.

FIG. 7 includes, in the form of components (19), (23), (24), and (25) the second curve pressure control mechanism which comes into force when an active ABS control has already been operating on the front wheel because of wheel lockup tendencies that have already developed. When a lockup tendency has been corrected on the front wheel (only in this way could the ABS be active on the front wheel), the curve pressure control (4) causes the ABS control (3) not to increase the front wheel pressure PO back again to the previous lockup pressure POin, but, upon reaching a lower pressure point, to stop the braking pressure buildup in order not to provoke any additional tendency to lockup. For this purpose, register (23) always stores the last pressure value from PO that resulted in a wheel overbraking.

Figure 7B:
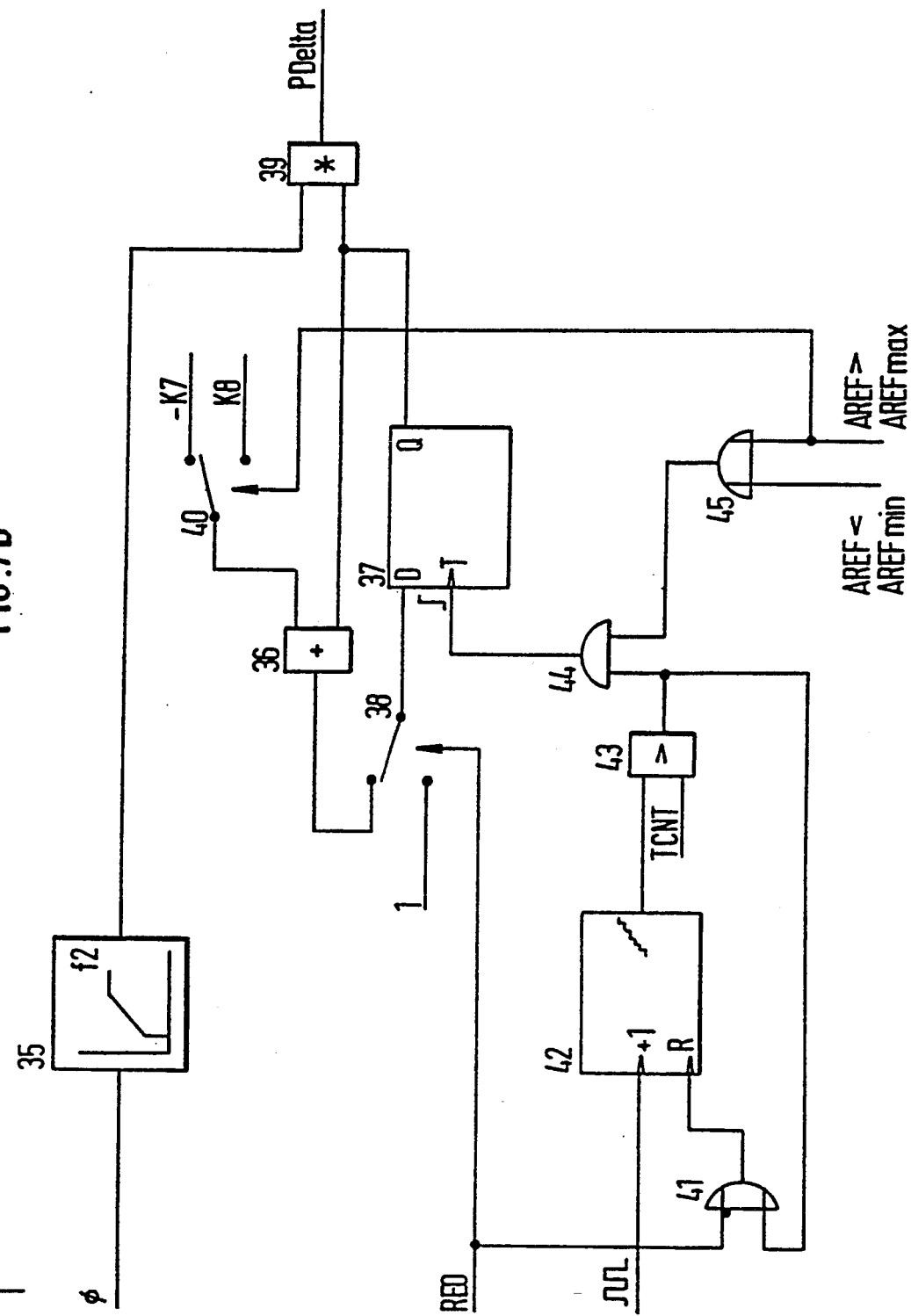
FIG. 7b shows an embodiment of the wiring diagram of the function PDelta=f2 ($\Phi$)

This occurs with the positive edge at the T-input, to which the signal REO is guided. REO is set by the ABS control to "1" at the beginning of a recognized wheel lockup tendency and, when the wheel enters the stable slip range, is reset to "0" again (see FIG. 6). Function block (19), depending on the current tilt angle (Φ), calculates a pressure value PDelta, which is subtracted with subtractor (24) from the stored lockup pressure POein. This yields the maximum permitted front wheel pressure POstop. When PO reaches its value, comparator (25) switches its output BOstop to "1" and indicates to the ABS control that the braking pressure buildup must in theory be held at the level reached and that PO also must be reduced in this cycle by the small amount DPO. Function generator (19) for generating the PDelta function according to FIG. 7b is composed of components (35) to (45). The theoretical operation is identical with that of the generator (16) already described above. The static basic function is performed here in block (35). Register (37) stores the correction factor by which the basic function is multiplied with the aid of block (39). The reset process to factor 1 is accomplished here with the aid of signal REO during each new front wheel overbraking. The respective subsequent reloading phase (REO="0") always begins with the basic function. A correction of the PDelta function, which again takes place because of vehicle deceleration values that are too low, here takes place in the form of a reduction of the function by the factor $(1-n*K7)$ after n correction steps.

As already mentioned above, correction of functions f1 and f2 takes place only when the vehicle deceleration becomes too low because of the intervention of the curve pressure control. This is monitored by components (20) and (22) in FIG. 7. Function generator (20), depending on tilt angle Φ, forms an anticipated minimum deceleration AREFmin. This is constantly compared with the vehicle reference deceleration actually calculated by the ABS control by comparator (22). For AREF < AREFmin, comparator (22) switches a logical "1" to its output and causes function blocks (16) and (19) to correct their function curves at the specified time points described above.

Function block (19) includes in addition the possibility of correcting the PDelta curve upward if the vehicle deceleration becomes so great that front wheel overbraking is soon likely. This takes place when AREF exceeds the value AREFmax which likewise depends upon Φ. For this case, multiplexer (40) connects constant +K8 to adder (36), so that when the next edge appears at the T-input the correction value stored in register (37) is increased by the amount K8.

Figure 7C:
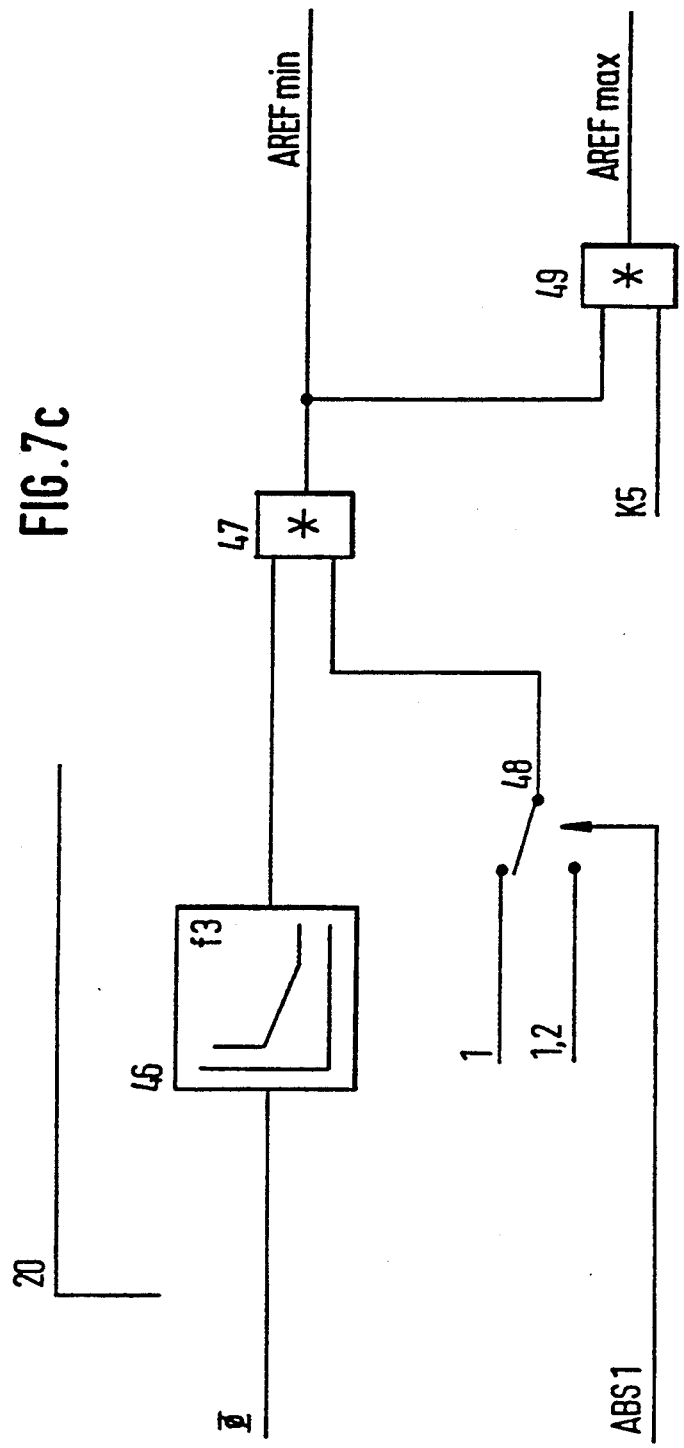
FIG. 7c shows an embodiment of the wiring diagram of the function AREFmin=f3 ($\Phi$)

Function block (20) according to FIG. 7c additionally consists of blocks (46) to (49). Block (46) represents the actual function generator. By means of multiplexer (48) and multiplier (47) the AREFmin basic function is increased by a factor of 1.2 when the rear wheel control is active, and is indicated by the ABS control by the signal ABS1="1". The AREFmax function is formed by multiplier (29), while it receives the AREFmin values with the constant factor K5. Comparator (20) switches a logical "1" to its output when the current AREF value exceeds the maximum tolerated comparative value AREFmax. This event means that, via the OR gate (45), gate switch (44) is switched to conduct, so that at the next correction time, an improved value can be entered in register (37).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Antilock braking system for a motorcycle having front and rear wheels, comprising:
   wheel sensors that output signals;
   a monitoring circuit coupled to the wheel sensors to receive the sensor output signals, and which detects overbraking states from the sensor output signals and generates corresponding control signals;
   A pressure modulator coupled to the monitoring circuit which adjusts brake pressures at the two wheels in response to the control signals;
   A curve pressure control, coupled to the monitoring circuit, that recognizes travel on curves and controllable regulated braking on curves, said curve pressure control having two acceleration sensors to determine the tilt angle Φ of the vehicle and, if this angle exceeds a critical threshold Φ krit, said curve pressure control causes the monitoring circuit to maintain, via the control signals, the brake pressure at the front wheel before an anticipated lockup pressure is reached; and
   wherein the acceleration sensors are mounted on the motorcycle such that a first one of the acceleration sensors detects horizontal vehicle acceleration perpendicular to a direction of travel and perpendicular to a vertical axis of the motorcycle, while a second one of the acceleration sensors measures vertical acceleration of the motorcycle at right angles thereto.

2. Antilock braking system according to claim 1, further comprising a lowpass filter coupled to the acceleration sensors that suppress high-frequency jitter components of the sensor output signals and assist in preventing low-frequency ground-produced noise components, and wherein the output signal from the first acceleration sensor must exceed at least half the value of the output signal from the second acceleration sensor for the tilt angle Φ determined by the sensor output signals to be considered valid.

3. Antilock braking system according to claim 1, wherein the acceleration sensors are mounted at 45° to the motorcycle and therefore both detecting one horizontal and one vertical acceleration component, and further comprising a lowpass filter coupled to the acceleration sensors and to the curve pressure control, wherein determination of the tilt angle following lowpass filtration of the two acceleration sensor signals is accurate due to suppression of ground-reduced noise components that occur in the vertical acceleration components of both acceleration sensors.

4. Antilock braking system according to claim 1, wherein the curve pressure control, apart from active ABS control, sets a maximum permissible front wheel brake pressure Pab as a function of the tilt angle, where Pab, for small tilt angles Φ, assumes a high value slightly below the anticipated wheel lockup brake pressure and, with increasing tilt angles Φ, decreases steadily according to at least one of a linear function and an exponential function.

5. Antilock braking system according to claim 4, wherein the curve pressure control includes means for performing active limitation of the front wheel brake pressure to the value Pab, even when the monitoring circuit still does not recognize any lockup tendency of the front wheel, so that in the event of brake application in the tilted position, at least on a surface with average frictional values, sufficient lateral guidance is ensured for the front wheel.

6. Antilock braking system according to claim 5, wherein the pressure modulator is a piston pressure modulator, and wherein the curve pressure control for the limitation of the front wheel brake pressure to the value Pab includes means for performing preventive preliminary adjustment of motor torque, and means for adjusting this torque such that the piston pressure modulator automatically and mechanically separates the front wheel brake cylinder from the main brake cylinder if the front wheel brake pressure exceeds the value Pab.

7. Antilock braking system according to claim 6, further comprising means for checking vehicle deceleration AREF at specified equidistant time intervals following initiation of pressure limitation to Pab, and means for correcting a function Pab=f1 when AREF undershoots a required minimum value AREFmin, the means for correcting including means for setting a higher brake pressure Pab in the event of insufficient deceleration AREF.

8. Antilock braking system according to claim 7, further comprising means for determining a minimum deceleration AREFmin as a function of the current tilt angle $\Phi$ according to a reciprocal function, so that a reduced deceleration of the motorcycle is produced as the tilt angle increases.

9. Antilock braking system according to claim 8, further comprising means for increasing the minimum deceleration AREFmin by a constant factor when an antilock protective control is acting on the rear wheel so as to anticipate a higher deceleration level due to rear wheel braking.

10. Antilock braking system according to claim 9, wherein the curve pressure control includes means for constantly storing, during active regulation, the front wheel brake pressure value POein which produces an overbraking state, and forming a reference pressure point POstop, with an amount PODelta=f2 ($\Phi$) being subtracted from a last lockup pressure POein, with the amount of PDelta being dependent on the tilt angle, and for delivering a signal POstop to the monitoring circuit to maintain the front wheel brake pressure PO when the front wheel brake pressure PO has reached the reference pressure point POstop in a reloading phase.

11. Antilock braking system according to claim 10, wherein the monitoring circuit includes means for, upon receiving signal POstop, reducing PO by a small amount DPO so that in the event of a constant tilt $\Phi$ the brake pressure PO is alternately reduced by small amounts and then increased again, whereupon a constant pressure level is effectively produced, and with increasing tilt angle $\Phi$ a corresponding pressure reduction to a lower level is produced, while when the tilt angle $\Phi$ is reduced, the normal brake pressure buildup of the reloading phase takes place, and stops buildup of the front wheel brake pressure PO.

12. Antilock braking system according to claim 10, further including means for checking, at specific equidistant time points, whether the vehicle deceleration AREF has been reached, and correcting a PDelta=f2 when the vehicle deceleration AREF undershoots a required minimum value AREFmin, with the correction taking place such that, in the event of an insufficient deceleration AREF, a small pressure differential PDelta is set.

13. Antilock braking system according to claim 10, further including means for checking, at specified equidistant time points following initiation of brake pressure maintenance, the vehicle deceleration AREF achieved, and for correcting a function PDelta=f2 when the vehicle deceleration AREF exceeds a required maximum value AREFmax, with the correction being made such that in the event of an excessive deceleration AREF, a greater pressure differential PDelta is set.

* * * * *